United States Patent [19]
Knorr

[11] Patent Number: 5,621,173
[45] Date of Patent: Apr. 15, 1997

[54] METHOD AND APPARATUS FOR NON-CONTACT DETERMINATION OF THE WEIGHT PER UNIT AREA OF THIN MATERIALS

[76] Inventor: Helmut Knorr, Dlessenor Strasse 1, D-86919 Utting, Germany

[21] Appl. No.: 428,126

[22] PCT Filed: Oct. 28, 1993

[86] PCT No.: PCT/DE93/01041

§ 371 Date: Apr. 26, 1995

§ 102(e) Date: Apr. 26, 1995

[87] PCT Pub. No.: WO94/10533

PCT Pub. Date: May 11, 1994

[30] Foreign Application Priority Data

Oct. 28, 1992 [DE] Germany .................. 42 36 436.1

[51] Int. Cl.⁶ .................................................. G01N 29/00
[52] U.S. Cl. .................... 73/610; 73/600; 73/159
[58] Field of Search .................. 73/159, 597, 598, 73/602, 609, 610, 615, 600, 1 DV; 162/49, 198, 263

[56] References Cited

U.S. PATENT DOCUMENTS

| | | | |
|---|---|---|---|
| 3,930,404 | 1/1976 | Ryden, Jr. | 73/610 |
| 4,446,735 | 5/1984 | Weilacher | 73/597 |
| 4,612,807 | 9/1986 | Wunderer | 73/159 |

*Primary Examiner*—Christine K. Oda
*Attorney, Agent, or Firm*—Furgang & Milde, L.L.P.

[57] ABSTRACT

A method and apparatus for non-contact determination of the weight per unit area and the thickness of thin materials. This involves directing an ultrasonic wave at the material and measuring the proportion of sound energy that passes through the material. The process is distinguished by the fact that the time intervals between the ultrasonic pulses are greater than the propagation time. At the receiver only the signals that exceed a certain amount and are shorter in duration than the propagation time are evaluated.

13 Claims, 3 Drawing Sheets

METHOD AND APPARATUS FOR NON-CONTACT DETERMINATION OF THE WEIGHT PER UNIT AREA OF THIN MATERIALS

BACKGROUND OF THE INVENTION

The present invention related to a method and apparatus for non-contact determination of the weight per unit area and/or the thickness of thin materials. The method involves directing an ultrasonic beam at the material and measuring the proportion of sound energy that passes through the material.

In the generic method, which is known from the German Patent No. 3 048 710, the length of time sound takes to travel directly from a transmitter to a receiver is first measured. The material being inspected is then introduced between the two components. To ensure that the receiver receives only direct sounds and no echoes, the transmitter transmits ultrasonic pulses, and the receiver turns on subsequent to a delay equal to the sound's travel time and off no later than twice that time. Gating is a technique that is in itself long known. Although it has significant advantages over conventional methods for the ultrasonic measurement of thickness, it does not solve all the problems involved. Since the aforesaid method is usually employed for inspecting paper money, the device can always be recalibrated between scanning one bill and the next.

When sheets of material are being inspected, on the other hand, it is not possible to recalibrate that often, and the sound travel time can be measured only prior to production. The distance between the transmitter and the receiver can vary as they expand and contract with fluctuations in temperature, as can the speed of sound in air, and the results will be affected accordingly. The results are even less reliable when the thickness of a sheet is to be measured from one edge to the other. In this event the transmitter and receiver shuttle back and forth across the sheet and there is absolutely no way of ensuring that the distance between them will remain absolutely constant.

The French Patent No. A 2 368 013 describes a system of off-surface detection of the thickness of materials. The transmitter and receiver are on the same side of the material. Phantom echoes can occur and extensively contaminate the results. The document discloses means of preventing the echoes from contaminating the results by appropriately controlling the transmitter such that no pulse is emitted until an interval longer than the sound's travel time plus the duration of the pulse elapses once the last echo has been received. This means that in the best possible case (when no echoes occur) there will be an interval of (travel time+pulse duration)×2 between commencement of the transmission of one signal and commencement of a subsequent signal, so that not many measurements are available for reliable processing during the briefest possible measuring period.

A principal object of the present application accordingly is to provide both a method and device that overcome the aforesaid drawbacks and are practical for monitoring the thickness of sheets of material, even from one edge to the other, during production.

This object, as well as other objects which will become apparent in the discussion that follows, are attained in accordance with the present invention by providing a method and apparatus in which the transmitter and receiver are arranged on opposite sides of the thin material. The transmitter transmits ultrasound pulses spaced in time by pause intervals that are longer than the period of time sound takes to travel from the transmitter to the receiver. The output signal from the receiver is processed only when the amplitude of this signal exceeds a prescribed level. Also, only a portion of the output signal produced by the receiver in response to the receipt of each respective ultrasound pulse is processed. This portion of the output signal has a duration which is less than the time that sound takes to travel from the transmitter to the receiver.

The invention requires only a single and very coarse measurement of the distance between the transmitter and the receiver. Since measurement commences only at a specific amplitude, any change in the distance between the two components can be compensated for. All that is necessary is to displace the detection window. Whereas all the measurements are equal in duration, the moment when a particular measurement begins depends on the signal leaving the receiver. The beginning of a measurement can accordingly be scheduled for the same transition through zero independently of the distance between the transmitter and the receiver and hence of the sound's travel time. It accordingly becomes unnecessary to constantly recalibrate with the removal of material between the transmitter and receiver.

Processing involves digitally sampling the signal leaving the receiver in a practical way at an integral multiple of the sound's frequency. Amplitude and phase are obtained in accordance with the present invention by subjecting the signal to a Fourier transform. The detected parameters can then be compared with a reference curve or analytic function to express the area weight of the sheet.

The reference curve is established at regular intervals by measuring a reference of known thickness and density.

The process may also be calibrated by measuring the characteristics of a material having a known thickness and area weight, as a reference.

Since the process may be calibrated by using reference curves or analytic functions, or by employing a physical calibration reference, the output may generate data which corresponds to the thickness of the material or weight per unit area.

Even more precise results can be obtained in one version of the method by also compensating for any fluctuations occurring in the temperature of the air during the operation that can affect how long the sound takes to travel from the transmitter to the receiver while the distance remains absolutely constant. This approach requires another receiver at a different distance from the transmitter but with the signal leaving it being processed exactly like the signal leaving the first receiver.

Additional advantages of the present invention will be evident from the dependent claims, and various embodiments will now be specified with reference to the drawing.

DESCRIPTION OF THE PREFERRED EMBODIMENTS

Figure 1:
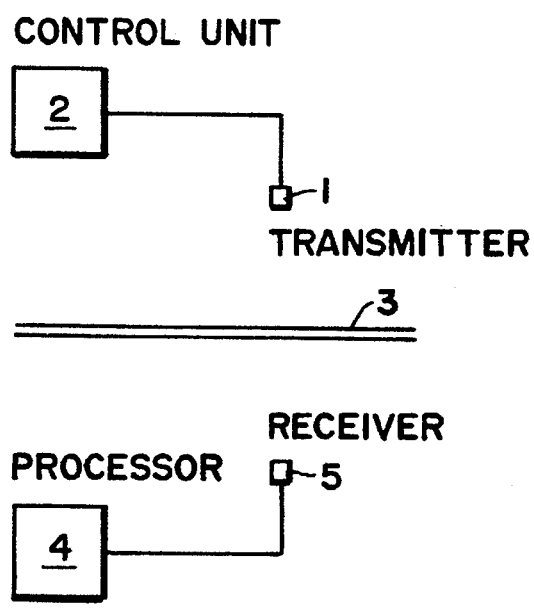
FIG. 1 illustrates one preferred embodiment of the invention with a stationary transmitter and receiver.

The control unit 2 in the embodiment illustrated in FIG. 1 emits an electronic signal to a transmitter 1. Transmitter 1 responds by transmitting an ultrasonic signal, in the form of a series of pulse packets or signal bursts, to a receiver 5 on the other side of a sheet 3 of material, the weight per unit area or thickness of which is to be measured. Receiver 5 responds by emitting an electronic signal to a processor 4.

The transmitter and/or receiver 5 are preferably either a broadband piezoelectric converter or a broadband electrostatic transducer.

Figures 4A, 4B:
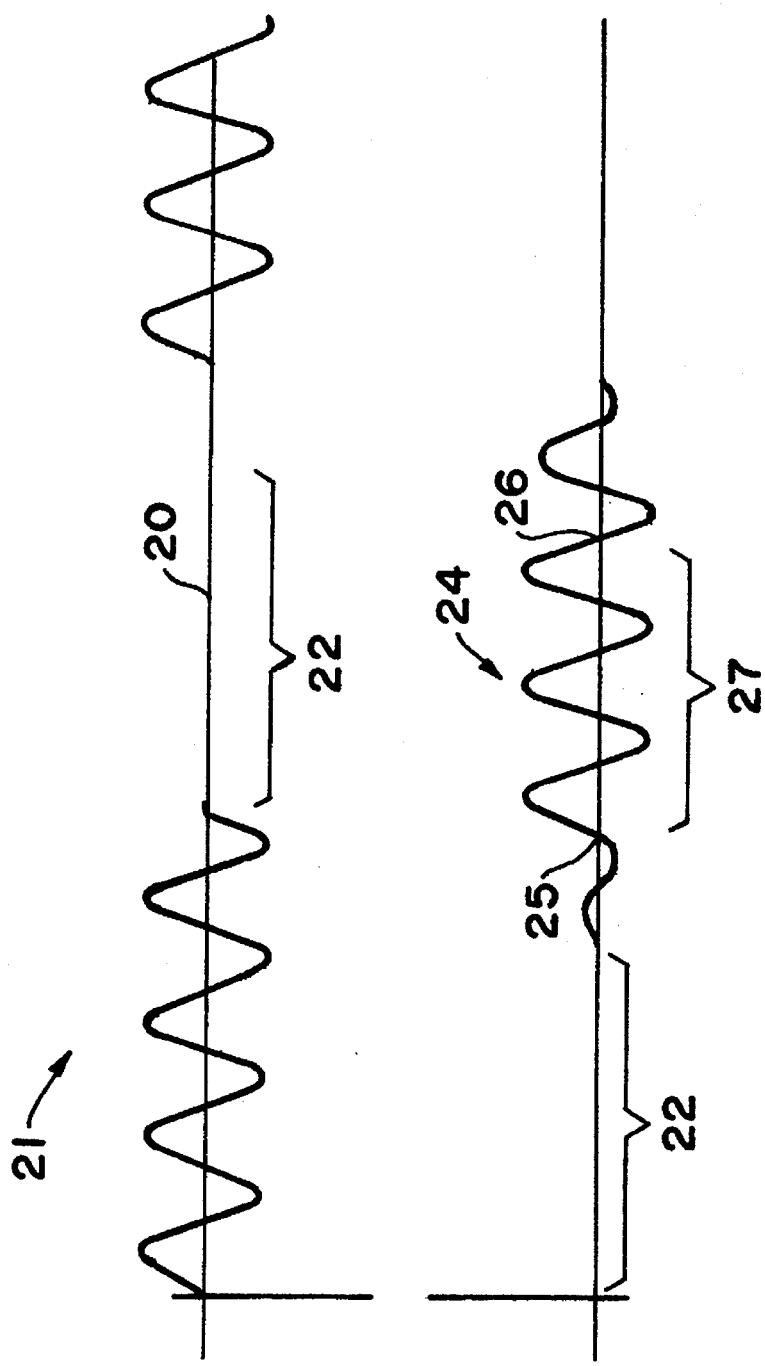
FIG. 4 is a graph of a signal leaving a transmitter.

FIG. 4a illustrates the actuating signal as a function of time. The interval 20 between the separate pulse packets 21 is definitely longer than the time 22 the sound takes to travel from transmitter 1 to receiver 5. The signal leaving receiver 5 is schematically illustrated in FIG. 4b. Since the receiver has inherent inertia, the signal's amplitude will initially increase, remain constant for a specific period, and then decrease.

When transmitter 1 is actuated by a signal burst or pulse packet 21 and emits an ultrasonic signal, the signal will induce oscillations in the receiver's diaphragm. The oscillations generate an output signal 24. Output signal 24 is displaced approximately sound-travel time 22 from the transmitter-actuating signal.

Output signal 24 is digitally sampled in processor 4 and subjected to Fourier transformation. It accordingly becomes possible to establish amplitude and phase with satisfactory precision.

Processing of the signal to determine the per unit area weight or thickness of the sheet 3 does not commence in accordance with the present invention until the amplitude achieves a prescribed level. Processing of the signal illustrated in FIG. 4b commences at a wave transition 25 through zero. Processing is discontinued subsequent to an interval 27 that is in any event briefer than time 22. Processing of the next packet in the output signal commences at the same transition, even if the travel time differs or the phase is displaced. Since the signal is processed again for the same interval 27, results will be reliable even when the distance between transmitter 1 and receiver 5 changes and when the temperature and sound speed of the air fluctuate.

Figure 2:
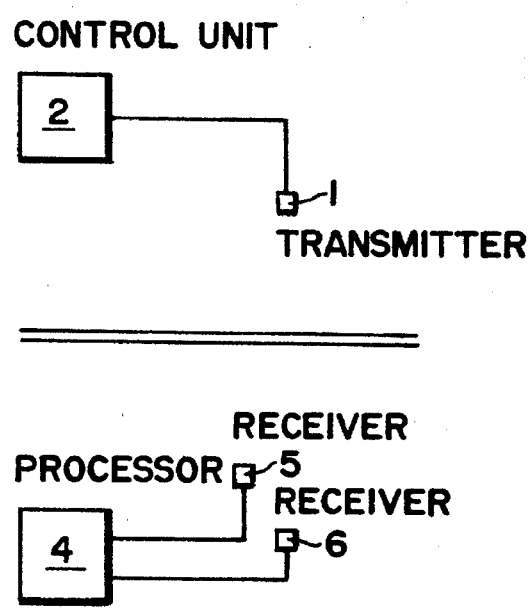
FIG. 2 illustrates another embodiment of the invention with one transmitter and two receivers.

Another improved embodiment is illustrated in FIG. 2, where similar components have the same reference numbers. This embodiment includes another receiver 6, which is farther away. The delay between the signal leaving receiver 5 and that leaving receiver 6 can be exploited in conjunction with the known distance between the receivers to measure the temperature of the air independent of any change in the distance between transmitter 1 and the combination of receivers 5 and 6.

Figure 3:
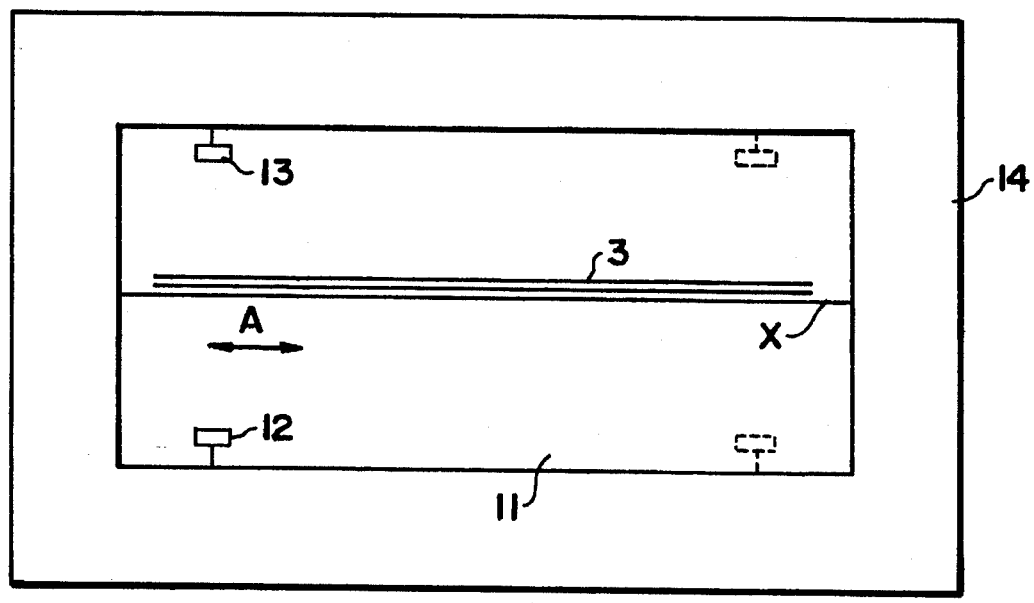
FIG. 3 illustrates still another embodiment of the invention with a transmitter and receiver that shuttle back and forth across a sheet.

The embodiment illustrated in FIG. 2 can be conventionally incorporated into the thickness-detecting device illustrated in FIG. 3. Sheet 3 rests on a counter 10 that has a transverse gap 11. Accommodated in the gap is a composite receiver 12 that can be displaced in the direction represented by the double-headed arrow A. Composite receiver 12 comprises the two receivers 5 and 6. A transmitter 13 can also be displaced along a rigid frame 14 in synchronization with composite receiver 12 into and out of the position indicated by the broken lines. The thickness of sheet 3 can accordingly be measured from one edge to the other.

Figure 5:
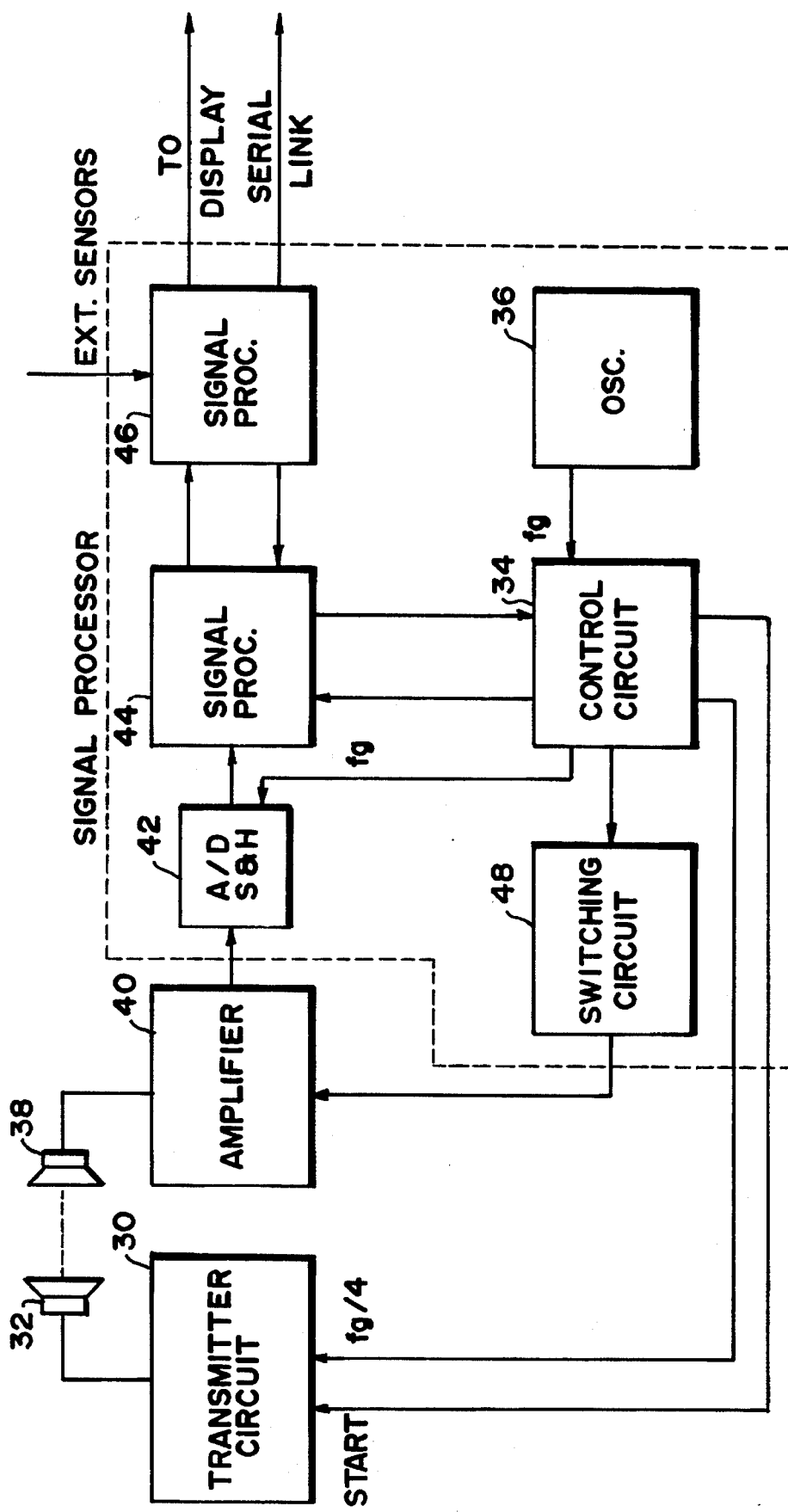
FIG. 5 is a block diagram or the signal processor used in the embodiments of FIG. 1–3.

FIG. 5 shows a signal processor which may be used with the present invention. A transmitter circuit 30 supplies pulse packets (signal bursts) to a transmitting transducer 32. The transmitter circuit 30 receives a continuous sinusoidal signal of frequency fg/4 plus an on/off gating control signal from a control circuit 34. The transmitting frequency fg/4 is obtained from an oscillator 36 of frequency fg and a 1:4 divider within the control circuit 34. After a time $t=L/331$, this signal burst reaches a receiving transducer 38 which supplies a corresponding signal to a multi-stage input amplifier 40. The amplified signal is passed to a digital sampler which includes an A/D converter and sample-and-hold circuit 42 which is synchronized with a signal of frequency fg. After the appearance and detection of an amplitude by a signal processor 44, the input amplifier 40 is controlled by means of the control circuit 34 and a switching circuit 48 until an evaluatable and well-defined signal appears in the signal processor 44. After determination of the amplitude and phase by the signal processor 44, the registration of the measuring window is established at always the same position within the received burst by performing a Fourier analysis using the frequency fg to determine the received frequency and the zero crossings thereof. The Fourier analysis can be simplified to an addition and subtraction of sampled values, when the sampling rate is four times the fundamental frequency (i.e., fg as compared to the fundamental (fg/4). In this case the cosine components are produced by interpolating addition/subtraction of even numbered sample values and the sine components are produced by interpolating addition/subtraction of the odd numbered sample values. This procedure compensates for variations in transit time caused by temperature, distance and pressure variations.

An amplitude variation is likewise corrected by means of a table of transit time variations. In addition, external influences are measured by external sensors and thereafter compared and compensated, and the signal burst is converted to an output value of weight per area in a signal processor 46. The output value is produced by processing the signal burst with an analytical function or by means of a table.

The signal processor described above can, of course, be realized by a suitably programmed microcomputer.

There has thus been shown and described a novel method and apparatus for non-contact determination of the weight per unit area of thin materials which fulfills all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

I claim:

1. A method of non-contact determination of at least one of the weight per unit area and thickness of thin material wherein a first receiver, arranged on one side of the material, receives ultrasonic waves generated by a transmitter arranged on the other side and produces a first output signal in response thereto; said method comprising the steps of transmitting ultrasound pulses spaced in time by pause intervals that are longer than the period of time sound takes to travel from the transmitter to the receiver; processing said first output signal only when said signal has an amplitude exceeding a prescribed level; and processing a portion of said first output signal in response to the receipt of each respective ultrasound pulse, said portion having a duration which is less than the time that sound takes to travel from the transmitter to the receiver.

2. The method defined in claim 1, wherein the processing of said first output signal during each received pulse period commences at a common point in said fist output signal, independently of any change in the distance between the transmitter and the receiver, whereas the length of the processed signal per transmitted pulse does not change.

3. The method defined in claim 2, wherein the processing of said first output signal during each received pulse period commences at he same transition through zero.

4. The method defined in claim 1, wherein said first output signal is scanned at an integral multiple of the frequency of the ultrasonic waves transmitted by the transmitter and wherein the amplitude and phase of the output signal are obtained by applying a Fourier transform.

5. The method defined in claim 4, wherein at least one of the per unit area weight and thickness are obtained from said amplitude and phase by application of a reference curve or analytic function.

6. The method defined in claim 1, wherein a second receiver is arranged at a different distance form the trasmitter than the first receiver and produces a second output signal in response thereto wherein said second output signal is processed in the same manner as said first output signal whereby a variation of at least one of the temperature and the distances between the transmitter and the two receivers is compensated for, utilizing the difference in sound travel time of between the transmitter and the two receivers.

7. The method as defined in claim 1, further comprising the step of periodically calibrating said processing by measuring properties of a material of known thickness and area weight as a reference.

8. In a device for non-contact determination of at least one of the weight per unit area and thickness of thin materials, with an ultrasonic transmitter disposed on one side of the material and a receiver disposed on the other, the improvement comprising (a) control means for applying bursts of high-frequency signals to the transmitter, spaced by intervals longer than the time sound takes to travel from the transmitter to the receiver, and (b) processor means which commences processing the signal leaving the receiver one the amplitude is at a prescribed level and discontinues processing said signal after a period which is shorter than the time it takes the sound to travel from the transmitter to the receiver.

9. The device as in claim 8, wherein the processor includes a digital sampler operated at an integral multiple of the transmitted ultrasonic frequency.

10. The device as in claim 9, wherein at least one of the transmitter and receiver is selected from the group consisting of a broadband piezoelectric converter and a broadband electrostatic transducer.

11. The device as in claim 10, further comprising a first receiver and a second receiver, said second receiver being disposed at a different distance from the transmitter than the first receiver.

12. The device as in claim 8, further comprising a first receiver and a second receiver, said second receiver being disposed at a different distance from the transmitter than the first receiver.

13. The device as in claim 8, wherein at least one of the transmitted and receiver is selected from the group consisting of a broadband piezoelectric converter and a broadband electrostatic transducer.

* * * * *